(12) United States Patent
Lorenz et al.

(10) Patent No.: US 8,987,529 B2
(45) Date of Patent: Mar. 24, 2015

(54) PROCESS FOR PREPARING POLYETHER POLYOLS

(71) Applicant: Bayer MaterialScience AG, Leverkusen (DE)

(72) Inventors: Klaus Lorenz, Dormagen (DE); Marcus Eichmann, Dusseldorf (DE)

(73) Assignee: Bayer MaterialScience AG, Leverkusen (DE)

(*) Notice: Subject to any disclaimer, the term of this patent is extended or adjusted under 35 U.S.C. 154(b) by 0 days.

(21) Appl. No.: 14/181,807

(22) Filed: Feb. 17, 2014

(65) Prior Publication Data

US 2014/0243560 A1     Aug. 28, 2014

(30) Foreign Application Priority Data

Feb. 22, 2013    (EP) ..................... 13156351

(51) Int. Cl.
    *C08G 65/26*      (2006.01)
    *C08G 65/00*      (2006.01)
    *C08G 65/30*      (2006.01)

(52) U.S. Cl.
    CPC ............ *C08G 65/2606* (2013.01); *C08G 65/00* (2013.01); *C08G 65/30* (2013.01)
    USPC ...................................................... 568/867

(58) Field of Classification Search
    USPC ...................................................... 568/867
    See application file for complete search history.

(56) References Cited

U.S. PATENT DOCUMENTS

| | | | |
|---|---|---|---|
| 2,902,478 A | 9/1959 | Anderson | |
| 3,085,085 A | 4/1963 | Wismer et al. | |
| 3,190,927 A | 6/1965 | Patton, Jr. et al. | |
| 3,823,145 A | 7/1974 | Louvar et al. | |
| 4,332,936 A | 6/1982 | Nodelman | |
| 4,430,490 A | 2/1984 | Doerge | |
| 4,507,475 A | 3/1985 | Straehle et al. | |
| 4,521,548 A | 6/1985 | Christen et al. | |
| 5,625,045 A | 4/1997 | Gupta et al. | |
| 6,827,858 B2 | 12/2004 | Bader et al. | |
| 7,772,330 B2 * | 8/2010 | Lorenz et al. | 525/438 |
| 8,501,904 B2 | 8/2013 | Lorenz et al. | |
| 2004/0167316 A1 | 8/2004 | Anderson et al. | |
| 2009/0048420 A1 | 2/2009 | Lorenz et al. | |
| 2011/0021738 A1 | 1/2011 | Lorenz et al. | |
| 2012/0184705 A1 | 7/2012 | Lorenz et al. | |

FOREIGN PATENT DOCUMENTS

| | | |
|---|---|---|
| EP | 0693513 B1 | 1/2001 |
| EP | 1751213 B1 | 2/2008 |
| FR | 1285708 A | 2/1962 |
| JP | 06157743 A | 6/1994 |
| RO | 118433 B1 | 5/2003 |
| WO | 9620972 | 7/1996 |
| WO | 9820061 A1 | 5/1998 |
| WO | 0114456 A1 | 3/2001 |

OTHER PUBLICATIONS

Database CAPLUS on STN, Acc. No. 1976:463982, Carroll et al., DE 2549449 A1 (May 13, 1976) (abstract).*
M. Ionescu, et al. in "Advances in Urethanes Science and Technology", 1998, 14, p. 151-218.
Handbuch Apparate [Apparatus Handbook]; Vulkan-Verlag Essen, 1st ed. (1990), p. 188-208.

* cited by examiner

*Primary Examiner* — Brian J Davis
(74) *Attorney, Agent, or Firm* — Donald R. Palladino; Robert S. Klemz

(57) ABSTRACT

The present invention relates to a process for solvent-free preparation of polyether polyols with blockwise polyether chain structure, based on starter compounds solid at room temperature.

18 Claims, No Drawings

PROCESS FOR PREPARING POLYETHER POLYOLS

CROSS-REFERENCE TO RELATED APPLICATIONS

This application claims the benefit of priority under 35 U.S.C. §119(a)-(g) of European Patent Application No. 13 156 351.2, filed Feb. 22, 2013.

BACKGROUND OF THE INVENTION

The present invention relates to a process for preparing polyether polyols by base-catalysed addition of alkylene oxides (epoxides) onto starter compounds which are solid at room temperature and have Zerevitinov-active hydrogen atoms.

Polyether polyols based on high-functionality starter compounds solid at room temperature, for example sugars, oligo- and polysaccharides, sugar alcohols (for example mannitol or sorbitol) and pentaerythritol, are generally reacted with polyfunctional isocyanates to give polyurethanes. It is equally possible through the use of such polyether polyols to obtain foamed or solid polyurethane materials. Specific demands on the mechanical properties of the material, flammability, through-curing characteristics of the reaction components or hydrophilicity or hydrophobicity of the material are generally addressed via the structure of the polyether polyol and therein, in turn, through the choice of starter compound(s) and the composition of the added alkylene oxides. The alkylene oxides can be metered in in a mixture or individually in succession, i.e. blockwise. Particular emphasis should be given here to the use of ethylene oxide as a pure block or to the use of blocks with a high ethylene oxide content as well as those formed from higher alkylene oxides, for example propylene oxide, since it is possible thereby to obtain not just polyurethane materials with elevated hydrophilicity but also, if the ethylene oxide has been metered in as an end block, polyether polyols having an elevated proportion of primary end groups, which impart to the polyether polyols elevated reactivity to isocyanates.

Starter compounds solid at room temperature can easily be made amenable to alkylene oxide addition reactions, by performing the alkylene oxide addition in the presence of solvents unreactive towards alkylene oxides, as described, for example, in U.S. Pat. No. 4,332,936. In general, however, for reasons of sustainability and product hygiene, the use of organic solvents is undesirable. In addition, it is necessary in this case to provide valuable reactor volume for the solvent.

It is also possible to use starter compounds liquid at room temperature and/or alkylene oxide addition products thereof as suspension aids for the solid starter compounds. If, in this case, the alkylene oxide addition products of starter compounds solid at room temperature are used, it is also possible in principle to obtain polyether polyols based exclusively on high-melting starter compounds in solvent-free form. Such processes are described, for example, in FR-A 1285708 and U.S. Pat. No. 3,190,927. However, the end products frequently exhibit inadequate dissolution capacity for starter compounds solid at room temperature, and in this case too, as in the case of use of solvents, a corresponding reactor volume for the suspension medium is required.

If water is used as a suspension medium/solvent for the starter compounds solid under reaction conditions, the alkylene oxide addition reaction can be stopped at a suitable point and the excess water can be removed by distillation. Such procedures are described in DE-A-1443022 and U.S. Pat. No. 4,430,490, but give rise to end products having lower functionalities as a result of the partial reaction of the water used as a suspension medium and solvent in the alkylene oxide addition. In addition, the controllability of the reaction in these so-called water methods is less good than reactions using other co-starters. It is necessary either to clean the glycol-containing wastewater formed, or to adjust the glycol content thereof to a constant value on recycling into the process. Equally, the intermediate distillative removal of the unreacted water leads to additional expenditure of time and energy.

It would therefore be desirable to perform the alkylene oxide addition reaction with minimum presence of solvents unreactive towards alkylene oxides and of other suspension aids at the reaction temperatures typically employed for base-catalysed alkylene oxide addition reactions of 70 to 180° C. However, in the preparation of blockwise polyether polyols having pure ethylene oxide blocks or those having a high proportion of oxyethylene units of greater than or equal to 75% by weight, it is difficult, in the absence of solvents, to obtain clear and homogeneous end products from solid starter compounds.

Prior systems fail to offer a satisfactory solution to the problems outlined with starters solid at room temperature, especially in the case of blockwise polyether polyols having a total content of oxyethylene units between 5 and 90% by weight based on the mass of all oxyalkylene units.

It was therefore an object of the present invention to provide a process for preparing polyether polyols based on starter compounds solid at room temperature, the polyether polyols obtained being formed from blocks having a content of oxyethylene units of greater than or equal to 75% by weight, as well as other blocks formed from at least 60% propylene oxide and not more than 40% by weight of ethylene oxide and having a total content of oxyethylene units between 5 and 90% by weight based on the mass of all oxyalkylene units. The use of solvents and any great amounts of co-starters liquid at room temperature should be avoided here, and the result should be that no turbidity or inhomogeneity occurs in the end products.

SUMMARY OF THE INVENTION

Surprisingly, the object was achieved by a process for preparing polyether polyols based on starter compounds having Zerevitinov-active hydrogen atoms, having n $E_n$ blocks each comprising at least 75% by weight of oxyethylene units, and m $P_m$ blocks each comprising at least 60% by weight of oxypropylene units, where n and m are each natural numbers from 1 to 10 and at least one starter compound having at least one Zerevitinov-active hydrogen atom and a melting point of ≥40° C., comprising reacting the at least one starter compound with ethylene oxide and propylene oxide in the presence of a catalyst, wherein the $P_m$ block(s) are metered in under the conditions of the following inequation:

$$\frac{x_m(PO)}{x(OH) * t_m(PO) * OHZ} < 0.0060 \text{ in}[g/(h*\{mg\ KOH\})] \quad (1)$$

where
  $x_m(PO)$ is defined as the molar amount of propylene oxide metered in for the $P_m$ block in mol,
  $x(OH)$ is defined as the molar amount of hydroxyl groups in the polyether polyol in mol, $t_m(PO)$ is defined as the metering time for the propylene oxide of the $P_m$ block in hours, OHZ is defined as the calculated OH number of the polyether polyol in mg KOH/g, and m is as defined above, and wherein the total content of oxyethylene units in the polyether polyol, based on the total mass of the alkylene oxides metered in, is from 5 to 90% by weight.

DETAILED DESCRIPTION OF THE PREFERRED EMBODIMENTS

The use of the word a in connection with countable parameters should be understood here and hereinafter to mean the number one only when this is evident from the context (for example through the wording "exactly one"). Otherwise, expressions such as "an epoxide", "a starter compound" etc. always refers to those embodiments in which two or more epoxides, two or more starter compounds etc. are used.

The process according to the invention enables reaction of starter compounds solid at room temperature with alkylene oxides to give polyether polyols, without any need for the use of solvents, co-starters or other suspension aids. This is advantageous both for economic reasons and for process technology reasons, since additional processing and workup steps are not necessary, and such processes are generally desirable for the development of renewable and resource-protective operations. The outcome enabled by the process according to the invention is that, without the use of solvents, clear and homogenous alkylene oxide addition products based on starter compounds solid at room temperature are obtained, these being usable in various ways as components of polyurethane materials comprising polyisocyanates.

Starter compounds in the context of the invention are understood to mean compounds having at least one Zerevitinov-active hydrogen atom. Hydrogen bonded to N, O or S is referred to as a Zerevitinov-active hydrogen hydrogen (or as "active hydrogen") when it gives methane by reaction with methylmagnesium iodide by a process discovered by Zerevitinov. Typical examples of compounds having Zerevitinov-active hydrogen are compounds containing carboxyl, hydroxyl, amino, imino or thiol groups as functional groups. Starter compounds solid at room temperature are understood to mean those starter compounds whose melting points are 40° C. or higher, and liquid starter compounds to mean those having melting points less than 40° C.

The invention is illustrated in detail hereinafter. Various embodiments can be combined here with one another as desired, unless the opposite is apparent to the person skilled in the art from the context.

Preferably in accordance with the invention, the starter compounds are solid starter compounds which are in solid form at ≤40° C. Examples thereof are mono-, oligo- and polysaccharide, pentaerythritol, dipentaerythritol, tripentaerythritol, trimethylolethane, trimethylolpropane, sorbitol, 1,12-dodecanediol, 1,2-decanediol, 1,10-decanediol, cyclic polyols (for example inositol), aromatic hydroxyl compounds (for example phenol, hydroquinone, catechol, resorcinol, 1,3,5-trihydroxybenzene, bisphenol A or bisphenol F), methylol-containing condensates of formaldehyde and phenol or melamine or urea, Mannich bases, high-functionality starter compounds based on hydrogenated starch hydrolysis products, polyamines (for example compounds based on high-functionality polycyclic aniline/formaldehyde condensation products ("polymeric MDA"), and isomers or isomer mixtures of tolylenediamine (especially 2,4-TDA, 2,6-TDA, 2,3-TDA, 3,4-TDA)). It is also possible to use compounds having carboxylic acid groups (for example malonic acid, glutaric acid or adipic acid) or compounds having hydroxyl and carboxylic acid functions (for example the isomers of hydroxybenzoic acid, the isomers of hydroxymethylbenzoic acid, the isomers of dihydroxybenzoic acid, the isomers of trihydroxybenzoic acid, mandelic acid, malic acid, citric acid, tartaric acid and mucic acid). The starter compounds used are preferably pentaerythritol, sucrose, trimethylolpropane and/or sorbitol, with particular preference being given to using sorbitol.

The starter compounds for use in accordance with the invention can also be used as mixtures. Together with the solid starter compounds, it is possible in accordance with the invention also to use small amounts, up to 30% by weight, based on the total mass of all starter compounds, of those having melting points lower than 40° C. These starter compounds are, for example, methanol, ethanol, 1-propanol, 2-propanol, and higher aliphatic monools liquid at room temperature, 1,2-propylene glycol, 1,3-propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, glycerol and triethanolamine, and also water.

The starter compounds for use in accordance with the invention are in solid form at 40° C. In order to facilitate the handling thereof, the starter compounds can be used in the form of an aqueous solution and dewatered, for example by a stripping step, before commencement of the actual alkylene oxide addition reaction or after interruption of an already running alkylene oxide addition reaction. In a preferred embodiment of the process according to the invention, no solvent is used in the reaction of the starter compound with ethylene oxide and propylene oxide and any further alkylene oxide compounds.

A process according to the invention which does not require the use of solvents is to be understood in such a way, that usual reaction conditions are applied without any extra addition of solvents unreactive towards alkylene oxides and/or water. A solvent-free process therefore comprises the use of starter compounds and alkylene oxides, which, due to their manufacturing process, still may contain traces of solvents (≤5% by weight), especially up to 2% by weight of water, provided these are not intentionally admixed.

Alkylene oxides suitable for the process according to the invention are, as well as ethylene oxide and propylene oxide, for example, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide and pinene oxide. Preference is given to using ethylene oxide and propylene oxide in the process according to the invention.

The polyether polyols prepared by the process according to the invention have block structures having at least one $E_n$ block and at least one $P_n$ block. The $E_n$ block(s) which are to be metered in in the process according to the invention and are rich in oxyethylene units, having a content of oxyethylene units of at least 75% by weight, can be metered in as internal blocks or as an end block. Preferably, the polyether polyols prepared by the process according to the invention have an $E_n$ block as the end block, since products having end blocks rich in oxyethylene units are characterized by an elevated proportion of primary end groups, which impart to the polyether polyols elevated reactivity to isocyanates. Preferably, at least one $E_n$ block contains at least 90% by weight of oxyethylene units; more preferably, at least one $E_n$ block contains 100% by weight of oxyethylene units. The total content of oxyethylene units in polyether polyols prepared by the process according to the invention is, based on the total mass of the alkylene oxides metered in, from 5 to 90% by weight. Preferably, the polyether polyol prepared by the process according to the invention contains up to 85% by weight of oxyethylene units based on the total mass of the alkylene oxides metered in. Preferably, the block $P_m$ contains or the blocks $P_m$ contain at least 60% by weight of oxypropylene units, more preferably at least 75% by weight of oxypropylene units, based on the total mass of the alkylene oxides metered in for this block or these blocks. In a preferred embodiment of the invention, the polyether polyols prepared by the process according to the invention, aside from the structural units originating from the starters, consist exclusively of the $E_n$ and $P_m$ blocks. The polyether polyols prepared by a process according to the invention are therefore block copolymers comprising blocks with a high ethylene oxide content $E_n$ as well as blocks with a high propylene oxide content $P_m$.

Changes in the block composition can be undertaken during the epoxide metering phase discontinuously or else continuously, within short periods.

The molar amount of hydroxyl groups in the polyether polyol (x(OH)) is calculated according to equation (2):

$$\frac{\sum_{i}^{l}(m_i * (OHZ)_i)}{56100} = x(OH) \quad (2)$$

where:
m$_i$: mass of the starter component i in g
(OHZ)$_i$: OH number of the starter component i
l: number of starter compounds used The relationship of the OH number to the equivalent molar mass is represented in general form in equation (3). The equivalent molar mass is understood to mean the number-average total molar mass of the material containing active hydrogen atoms divided by the number of active hydrogen atoms (functionality).

OH number[mg KOH/g]=56 100[mg KOH/mol]/
equivalent molar mass[g/mol] (3)

The calculated OH numbers of the polyether polyols obtainable by the process according to the invention preferably have values of 50 mg KOH/g to 400 mg KOH/g, more preferably of 80 mg KOH/g to 300 mg KOH/g, most preferably of 95 mg KOH/g to 220 mg KOH/g.

In the process according to the invention, preference is given to using basic catalysts, for example alkali metal hydrides, alkali metal carboxylates (for example of monofunctional carboxylic acids), alkali metal hydroxides, alkali metal alkoxides (for example of monofunctional alcohols) or amines. An overview of amines suitable for the process according to the invention has been given by M. Ionescu et al. in "Advances in Urethanes Science and Technology", 1998, 14, p. 151-218. For example, it is possible to use N,N-dimethylbenzylamine, dimethylaminopropanol, N-methyldiethanolamine, trimethylamine, triethylamine, N,N-dimethylcyclohexylamine, N-methylpyrrolidine, N,N,N',N'-tetramethylethylenediamine, diazabicyclo[2.2.2]octane, 1,4-dimethylpiperazine, N-methylmorpholine, unsubstituted imidazole and/or alkyl-substituted imidazole derivatives. The basic catalysts used in the process according to the invention are preferably alkali metal hydroxides (for example sodium hydroxide, potassium hydroxide or caesium hydroxide), alkali metal alkoxides of mono- or polyfunctional alcohols, imidazole or alkyl-substituted imidazole derivatives (for example N-methylimidazole). In the process according to the invention, particular preference is given to using alkali metal hydroxides, and among these very particular preference to using potassium hydroxide.

The alkali metal hydroxides can be supplied to the starter compounds solid at room temperature in solid form or as highly concentrated aqueous solutions. Water of dissolution and the water which arises through the reaction of the alkali metal hydroxides with the Zerevitinov-active hydrogen atoms in the starter compound are removed by means of a stripping step upstream of the alkylene oxide metering phase. If, in the case of alkali metal hydroxide catalysis, aqueous solutions of starter compounds solid at room temperature are used, it is appropriate to perform only one stripping step, for example, before commencement of the actual alkylene oxide addition phase or, less preferably, after interruption of an already running alkylene oxide addition reaction.

The basic catalysts are generally used in amounts, based on the amount of end product, of 0.004 to 1.0% by weight, preferably 0.05 to 1.0% by weight.

It may turn out beneficial to adjust the amount of catalyst to the final concentration needed for running the alkylene oxide addition reaction just after a first dosage of a partial amount of the total quantity of alkylene oxides. Water brought again into the process by such a step and/or water generated again by the reaction of the alkali metal hydroxide with the Zerevitinov-active hydrogen atoms of the starter compound is then preferably being removed before resuming the alkylene oxide dosage.

In the process according to the invention, the at least one starter compound is reacted with ethylene oxide and propylene oxide preferably at a temperature of 70 to 170° C., more preferably at a temperature of 100 to 160° C. The temperature may vary during the alkylene oxide metering phase within the limits described.

In order to achieve an optimal balance between high alkylene oxide conversion and low by-product formation in the case of use of sensitive starter compounds (for example sucrose), it is possible to first alkoxylate at low reaction temperatures (for example at 70 to 110° C.), and only when starter conversion is sufficient (for example as soon as at least 50% by weight of the starter compounds used have reacted with alkylene oxide at least one Zerevitinov-active hydrogen atom) to move to higher reaction temperatures (for example to from 110 to 130° C.).

If long-chain polyether polyols, i.e. polyether polyols having equivalent molar masses greater than 500 Da, are prepared, it is advisable, in the case of attainment of high equivalent molar masses and in the case of metered addition of propylene oxide-containing blocks, for example at 500 Da or higher equivalent molar masses, to restrict the reaction temperature to values of 120° C., preferably 110° C. or less, in order to reduce to a tolerable degree the side reactions of the propylene oxide, especially the rearrangement thereof to allyl alcohol. The extent of these side reactions naturally increases with the content of propylene oxide in the alkylene oxide mixture metered in; therefore, the restriction in the reaction temperature is recommended when the propylene oxide content in the alkylene oxide mixture metered in exceeds values of 30% by weight, especially when it exceeds values of 50% by weight or even 70% by weight. The metered addition of blocks of high ethylene oxide content or of blocks of pure ethylene oxide, and also post-reactions, can in turn be performed at higher temperatures (i.e. after raising the temperature to 100 to 170° C., preferably 100 to 150° C.). It may be necessary to keep the temperature of the exothermic alkylene oxide addition reaction at the desired level by cooling. Such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers (Ullmann's Encyclopedia of Industrial Chemistry, volume B4, page 167ff., 5th edition, 1992). These should advantageously be designed such that effective cooling is possible even at the start of the metering phase, i.e. in the case of a low fill level, and in the presence of heterogeneous reactor contents (for example in the presence of solid dispersions).

Generally, good mixing of the reactor contents has to be ensured in all reaction phases through design and use of standard stirring units, suitable stirring units here being especially stirrers arranged over one or more levels or stirrer types which act over the full fill height (see, for example, Handbuch Apparate [Apparatus Handbook]; Vulkan-Verlag Essen, 1st ed. (1990), p. 188-208). Of particular technical relevance here is a volume-specific mixing power which is introduced on average over the entire reactor contents and is generally in the range from 0.2 W/l to 5 W/l, based on the reactor volume, with correspondingly higher local power inputs in the region of the stirrer units themselves and possibly in the case of relatively low fill levels. In order to achieve optimal stirring action, a combination of baffles (for example flat or tubular baffles) and cooling coils (or cooling cartridges) may be arranged within the reactor, and these may also extend over the vessel base. The stirring power of the mixing unit may also be varied as a function of the fill level during the metering phase, in order to ensure a particularly high power input in critical reaction phases. For example, it may be advantageous to vigorously mix solids-containing dispersions which may be present at the start of the reaction in the case of (additional) use of sucrose, or viscous melts of starters solid at room temperature. Moreover, when solid starters are used, it has to be ensured through the selection of the stirrer unit that sufficient dispersion of the solids in the reaction mixture is assured. Preference is given to stirrer levels passing close to the bottom, and stirrer units particularly suitable for suspension. In addition, the stirrer geometry should contribute to reducing the foaming of reaction products. The foaming of reaction mixtures can be observed, for example, after the end of the metering and post-reaction phase, when residual alkylene oxides are additionally removed under reduced pressure, at absolute pressures in the range from 1 mbar to 500 mbar. For such cases, suitable stirrer units have been found to be those which achieve continuous mixing of the liquid surface. According to the requirement, the stirrer shaft has a base bearing and optionally further support bearings in the vessel. The stirrer shaft can be driven from the top or bottom (with central or eccentric arrangement of the shaft).

Alternatively, it is also possible to achieve the necessary mixing exclusively by means of a pumped circulation system conducted through a heat exchanger, or to operate this pumped circulation system as a further mixing component in addition to the stirrer unit, in which case the reactor contents are pumped in circulation as required (typically 1 to 50 times per hour). The specific mixing energy introduced by means of pumped circulation, for example by means of any external heat exchanger or, in the case of recycling into the reactor, by means of a nozzle or injector, likewise amounts to values averaging from 0.2 to 5 W/l, this being based on the liquid volume present in the reactor and the pumped circulation system at the end of the reaction phase.

The alkylene oxides can be supplied to the reactor in different ways: one option is metered addition into the gas phase or directly into the liquid phase, for example, by means of an immersed tube or a distributor ring close to the reactor base in a zone with good mixing. The continuous metered addition of the at least one alkylene oxide is effected such that the safety-related pressure limits of the reactor system used are not exceeded. These are naturally guided by the apparatus features in the particular case, the operation being executed generally within a pressure range from 1 mbar to 10 bar, more preferably from 1 mbar to 4 bar. Especially in the case of metered addition of ethylene oxide-containing alkylene oxide mixtures or pure ethylene oxide, it should advantageously be ensured that a sufficient partial inert gas pressure is maintained within the reactor during the start-up and metering phase. This can be established, for example, by means of noble gases or nitrogen. In the case of metered addition into the liquid phase, the metering units should be designed such that they self-empty, for example, through provision of metering holes on the underside of the distributor ring. Generally, apparatus measures, for example the installation of non-return valves, should prevent backflow of reaction medium into the metering units and reactant reservoirs. If an alkylene oxide mixture is being metered in, the respective alkylene oxides can be supplied to the reactor separately or as a mixture. Premixing of the alkylene oxides with one another can be achieved by means of a mixing unit present in the common mixing zone ("inline blending"). It has also been found to be useful to meter the alkylene oxides, on the pump pressure side, individually or in premixed form into a pumped circulation system conducted, for example, through one or more heat exchangers. In that case, for good mixing with the reaction medium, it is advantageous to integrate a high-shear mixing unit into the alkylene oxide/reaction medium stream.

Generally, a wide variety of different reactor types are suitable for the performance of the process according to the invention. In general, cylindrical vessels having a height to diameter ratio of 1:1 to 10:1 are used. Useful reactor bases include hemispherical, dished, flat or conical bases.

After metered addition of epoxide has ended, or in the event of a change in the composition of the alkylene oxide mixture metered in, there may follow post-reaction phases in which residual alkylene oxide is depleted. The end of such a post-reaction phase has been attained when no further pressure drop can be detected in the reaction tank. Traces of unreacted alkylene oxides, after the end of the (post-)reaction phase, can optionally be removed quantitatively under reduced pressure, at an absolute pressure of 1 mbar to 500 mbar, or by stripping. Stripping removes volatile constituents, for example (residual) alkylene oxides, with introduction of inert gases or steam into the liquid phase with simultaneous application of reduced pressure, for example by passing inert gas through at an absolute pressure of 5 mbar to 500 mbar. The removal of volatile constituents, for example of unconverted alkylene oxides, either under reduced pressure or by stirring, is effected at temperatures of 20° C. to 200° C., preferably at 50° C. to 160° C., and preferably with stirring. The stripping operations can also be performed in what are called stripping columns, in which an inert gas or steam stream is passed counter to the product stream. Preference is given to performing the stripping operation with inert gases in the absence of steam.

After attainment of constant pressure or after removal of volatile constituents under reduced pressure and/or stripping, the product can optionally be subjected to workup steps, in order to remove any catalyst traces. In the case of alkylene oxide addition reactions catalysed with amines, such aftertreatment steps are generally not required. The optional removal of the catalyst from the crude product can be effected in various ways: For example, the basic catalyst can be neutralized with dilute mineral acids such as sulphuric acid or phosphoric acid. The salts formed in the course of neutralization are removed, for example by filtration. Exceptions are the polyether polyol preparation processes described in EP-A 2028211, WO-A 2009/152954, WO-A 2011/039145 and WO-A 2009/106244, which include workup processes without salt removal steps. Alternatively, the neutralization can be effected with hydroxycarboxylic acids (for example lactic acid, as described in WO-A 98/20061 and US-A 2004/167316). Equally suitable for neutralization are carboxylic acids, for example formic acid, as described in U.S. Pat. No. 4,521,548. The metal carboxylates formed by the neutralization with carboxylic acids (for example hydroxycarboxylic acids or formic acid) are soluble in the polyether polyol to give a clear solution, and so the removal of the salts can be dispensed with here. It is likewise possible to remove the catalyst by using acidic cation exchangers, as described, for example, in DE-A 100 24 313. In addition, the catalysts can be removed by means of adsorbents, for example sheet silicates (bentonite, attapulgite), diatomaceous earth, or else with the aid of synthetic magnesium silicates (such as AMBOSOL® or BriteSorb®). Such purification processes are described in RO 118433, U.S. Pat. No. 4,507,475, EP-A 0693513 and EP-A 1751213. Phase separation processes, which may be promoted by hydrophobic solvents, are likewise possible in principle. The water solubility of the polyether polyol containing oxyethylene units prepared on the basis of the starter compounds solid at room temperature can, however, be too high for the effective performance of phase separation processes. Phase separation processes are described, for example, in WO-A 01/14456, JP-A 6-157743, WO-A 96/20972 and U.S. Pat. No. 3,823,145.

It has been found to be advantageous to always handle polyols under inert gas atmosphere. This is especially true of alkaline polyether polyols as obtained, for example, under alkali metal hydroxide catalysis prior to removal of the catalyst, or of products obtained under amine catalysis. For salt-free, worked-up and stabilized finished products too, or polyether polyols prepared by means of double metal cyanide catalysis (DMC catalysis), handling and storage with exclusion of oxygen is recommended. Inert gases suitable for this purpose are, for example, noble gases, nitrogen or carbon dioxide; noble gases or nitrogen are particularly suitable. The prevention of ingress of oxygen very substantially prevents product discoloration; this is especially true at elevated temperatures, which are generally utilized in order to facilitate the handling of the polyether polyols through lowering of the product viscosity. Furthermore, under an inert gas atmosphere, a much lower level of peroxide groups also arises, these contributing to cleavage of the polyether chains to form further low molecular weight oxidative degradation products, for example acetaldehyde, methanol, formic acid, formic esters, acetone and formaldehyde. Thus, the content of volatile organic compounds in the polyether polyol can be lowered, and odor nuisance, damage to health and inferior quality can be avoided. It is optionally possible to add ageing stabilizers, for example antioxidants, to the polyether polyol prepared by the process according to the invention. The process according to the invention can be used to prepare polyether polyols which at 20° C. are, in particular, visually clear and/or homogeneous.

The polyether polyols prepared by the process according to the invention can be used as starting components for the production of solid or foamed polyurethane materials and of polyurethane elastomers. The polyurethane materials and elastomers may also contain isocyanurate, allophanate and biuret structural units. It is likewise possible to prepare what are called isocyanate prepolymers, the preparation of which involves using at least one (poly)isocyanate and at least one polyether polyol obtainable by the process according to the invention, the molar ratio of isocyanate groups to hydroxyl groups being greater than 1, such that the resulting prepolymers contain isocyanate groups. The isocyanate groups in the prepolymers can be reacted in one or more steps with compounds containing Zerevitinov-active hydrogen atoms for production of the actual end products, for example solid or foamed polyurethane materials or polyurethane elastomers. Conversely, it is also possible to react (poly)isocyanates and at least one polyether polyol obtainable by the process according to the invention in such a way that the molar ratio of isocyanate groups to hydroxyl groups is less than 1, and hence the resulting prepolymers contain hydroxyl groups. The hydroxyl groups in the prepolymers can be reacted in one or more steps with isocyanate-containing compounds for production of the actual end products, for example solid or foamed polyurethane materials or polyurethane elastomers.

For production of solid or foamed polyurethane materials and of polyurethane elastomers, the polyether polyols obtainable by the process according to the invention are optionally mixed with further isocyanate-reactive components and reacted with organic polyisocyanates, optionally in the presence of blowing agents, catalysts and/or other additives, for example cell stabilizers.

EXAMPLES

Raw Materials Used:
IRGANOX® 1076:
Octadecyl 3-(3,5-di-tert-butyl-4-hydroxyphenyl)propionate (Ciba Specialty Chemicals (now BASF))
Test and Determination Methods:
OH Number and Viscosity The OH numbers were determined by the method of DIN 53240. The viscosities were found by means of a rotary viscometer (Physica MCR 51, manufacturer: Anton Paar) by the method of DIN 53019 (CC27 spindle type, shear rate range 16-128 $s^{-1}$).

Example 1

A 2 liter laboratory autoclave under a nitrogen atmosphere was charged with 93.3 g of an aqueous sorbitol solution containing 70% by weight of sorbitol, and 5.391 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 120° C. and 208.0 g of propylene oxide (3.581 mol) were metered into the headspace of the autoclave at a stirrer speed of 800 rpm over a period of 5.88 h; the metered addition was commenced at an absolute pressure of 0.05 bar. The end of metered addition of propylene oxide was followed by a post-reaction period of duration 1.0 h. The reactor pressure was then adjusted by means of nitrogen to 2.55 bar and a total of 933.4 g of ethylene oxide were metered into the headspace of the autoclave over a period totalling 9.95 h, commencing at 120° C. Once 360 g of ethylene oxide had been metered in, the reaction temperature in the course of further metered addition of ethylene oxide was raised to 150° C., which was attained after a further 370 g of the amount of ethylene oxide had been metered in. The remaining ethylene oxide was metered in at 150° C. After a post-reaction period of duration 0.87 h, the product was devolatilized by heating at 150° C. under reduced pressure (10 mbar) over a period of 30 min. After cooling to 80° C., 120 ml of distilled water and 17.395 g of a 12.15% by weight aqueous sulphuric acid solution were added, and the mixture was stirred at 80° C. over a period of 30 min. The mixture formed was discharged into a glass flask, and 0.5431 g of IRGANOX® 1076 was added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 102 mg KOH/g and a viscosity of 711 mPas (at 25° C.) was obtained.

Example 2

A 2 liter laboratory autoclave under a nitrogen atmosphere was charged with 93.6 g of an aqueous sorbitol solution containing 70% by weight of sorbitol, and 5.303 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 208.5 g of propylene oxide (3.590 mol) were metered into the headspace of the autoclave at a stirrer speed of 800 rpm over a period of 4.05 h; the metered addition was commenced at an absolute pressure of 0.05 bar. The end of metered addition of propylene oxide was followed by a post-reaction period of duration 0.32 h. The reactor pressure was then adjusted by means of nitrogen to 2.55 bar and a total of 936.3 g of ethylene oxide were metered in over a period totalling 8.58 h at 150° C. After a post-reaction period of duration 0.80 h, the product was devolatilized by heating at 150° C. under reduced pressure (10 mbar) over a period of 30 min. After cooling to 80° C., 120 ml of distilled water and 17.129 g of a 12.15% by weight aqueous sulphuric acid solution were added, and the mixture was stirred at 80° C. over a period of 30 min. The mixture formed was discharged into a glass flask, and 0.5427 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 100 mg KOH/g and a viscosity of 707 mPas (at 25° C.) was obtained.

Example 3

A 2 liter laboratory autoclave under a nitrogen atmosphere was charged with 151.5 g of an aqueous sorbitol solution containing 70% by weight of sorbitol, and 5.297 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.2 h. In the course of this, towards the end of the dewatering period, a pressure of 100-120 mbar was established. The mixture was heated to 150° C. and 337.4 g of propylene oxide (5.809 mol) were metered into the headspace of the autoclave at a stirrer speed of 800 rpm over a period of 1.75 h; the metered addition was commenced at an absolute pressure of 0.05 bar. The end of metered addition of propylene oxide was followed by a post-reaction period of duration 0.88 h. The reactor pressure was then adjusted by means of nitrogen to 2.55 bar and a total of 757.1 g of ethylene oxide were metered in over a period totalling 3.32 h at 150° C. After a post-reaction period of duration 0.87 h, the product was devolatilized by heating at 150° C. under reduced pressure (10 mbar) over a period of 30 min. After cooling to 80° C., 120 ml of distilled water and 18.381 g of a 11.74% by weight aqueous sulphuric acid solution were added, and the mixture was stirred at 80° C. over a period of 30 min. The mixture formed was discharged into a glass flask, and 0.5446 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 160 mg KOH/g and a viscosity of 694 mPas (at 25° C.) was obtained.

Example 4

A 2 liter laboratory autoclave under a nitrogen atmosphere was charged with 176.5 g of an aqueous sorbitol solution containing 70% by weight of sorbitol, and 5.179 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 2.87 h. In the course of this, towards the end of the dewatering period, a pressure of 100-120 mbar was established. The mixture was heated to 150° C. and 196.2 g of propylene oxide (3.378 mol) were metered into the headspace of the autoclave at a stirrer speed of 800 rpm over a period of 1.1 h; the metered addition was commenced at an absolute pressure of 0.05 bar. The end of metered addition of propylene oxide was followed by a post-reaction period of duration 0.82 h. The reactor pressure was then adjusted by means of nitrogen to 2.55 bar and a total of 880.7 g of ethylene oxide were metered in over a period totalling 4.35 h at 150° C. After a post-reaction period of duration 0.35 h, the product was devolatilized by heating at 150° C. under reduced pressure (10 mbar) over a period of 30 min. After cooling to 80° C., 120 ml of distilled water and 17.971 g of a 11.74% by weight aqueous sulphuric acid solution were added, and the mixture was stirred at 80° C. over a period of 30 min. The mixture formed was discharged into a glass flask, and 0.5537 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 191 mg KOH/g and a viscosity of 744 mPas (at 25° C.) was obtained.

Example 5

A 2 liter laboratory autoclave under a nitrogen atmosphere was charged with 133.5 g of an aqueous sorbitol solution containing 70% by weight of sorbitol, and 5.060 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 201.7 g of propylene oxide (3.473 mol) were metered into the headspace of the autoclave at a stirrer speed of 800 rpm over a period of 1.47 h; the metered addition was commenced at an absolute pressure of 0.05 bar. The end of metered addition of propylene oxide was followed by a post-reaction period of duration 1.1 h. The reactor pressure was then adjusted by means of nitrogen to 2.55 bar and a total of 905.2 g of ethylene oxide were metered in over a period totalling 4.53 h at 150° C. After a post-reaction period of duration 0.92 h, the product was devolatilized by heating at 150° C. under reduced pressure (10 mbar) over a period of 1.45 h. After cooling to 80° C., 120 ml of distilled water and 19.8417 g of a 11.74% by weight aqueous sulphuric acid solution were added, and the mixture was stirred at 80° C. over a period of 30 min. The mixture formed was discharged into a glass flask, and 0.5410 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 143 mg KOH/g and a viscosity of 692 mPas (at 25° C.) was obtained.

Example 6, Comparative

A 2 liter laboratory autoclave under a nitrogen atmosphere was charged with 93.27 g of an aqueous sorbitol solution containing 70% by weight of sorbitol, and 5.667 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 207.3 g of propylene oxide (3.569 mol) were metered into the headspace of the autoclave at a stirrer speed of 800 rpm over a period of 1.62 h; the metered addition was commenced at an absolute pressure of 0.05 bar. The end of metered addition of propylene oxide was followed by a post-reaction period of duration 0.38 h. The reactor pressure was then adjusted by means of nitrogen to 2.55 bar and a total of 928.3 g of ethylene oxide were metered in over a period totalling 8.58 h at 150° C. After a post-reaction period of duration 0.28 h, the product was devolatilized by heating at 150° C. under reduced pressure (10 mbar) over a period of 30 min. After cooling to 80° C., 120 ml of distilled water and 18.280 g of a 12.15% by weight aqueous sulphuric acid solution were added, and the mixture was stirred at 80° C. over a period of 30 min. The mixture formed was discharged into a glass flask, and 0.5388 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 102 mg KOH/g was obtained. The material solidified in the course of cooling to room temperature. At 40° C., a viscosity of 316 mPas was found.

Example 7, Comparative

A 2 liter laboratory autoclave under a nitrogen atmosphere was charged with 93.4 g of an aqueous sorbitol solution containing 70% by weight of sorbitol, and 2.793 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 208.1 g of propylene oxide (3.583 mol) were metered into the headspace of the autoclave at a stirrer speed of 800 rpm over a period of 1.75 h; the metered addition was commenced at an absolute pressure of 0.05 bar. The end of metered addition of propylene oxide was followed by a post-reaction period of duration 1.05 h. The reactor pressure was then adjusted by means of nitrogen to 2.55 bar and a total of 934.4 g of ethylene oxide were metered in over a period totalling 8.55 h at 150° C. After a post-reaction period of duration 0.50 h, the product was devolatilized by heating at 150° C. under reduced pressure (10 mbar) over a period of 30 min. After cooling to 80° C., 120 ml of distilled water and 9.8637 g of a 12.15% by weight aqueous sulphuric acid solution were added, and the mixture was stirred at 80° C. over a period of 30 min. The mixture formed was discharged into a glass flask, and 0.5331 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 102 mg KOH/g was obtained. The material became turbid after a few days of storage at room temperature. At 25° C., a viscosity of 723 mPas was found.

Example 8, Comparative

A 2 liter laboratory autoclave under a nitrogen atmosphere was charged with 162.4 g of an aqueous sorbitol solution containing 70% by weight of sorbitol, and 10.798 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 869.1 g of propylene oxide (14.964 mol) were metered into the headspace of the autoclave at a stirrer speed of 800 rpm over a period of 3.32 h; the metered addition was commenced at an absolute pressure of 0.05 bar. After a post-reaction period of duration 2.63 h, the product was devolatilized by heating at 150° C. under reduced pressure (10 mbar) over a period of 30 min. After cooling to 80° C., 100 ml of distilled water and 33.209 g of a 12.22% by weight aqueous sulphuric acid solution were added, and the mixture was stirred at 80° C. over a period of 30 min. The mixture formed was discharged into a glass flask, and 1.7081 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 208 mg KOH/g and a viscosity of 1225 mPas (at 25° C.) was obtained.

Example 9, Comparative

A 2 liter laboratory autoclave under a nitrogen atmosphere was charged with 93.6 g of an aqueous sorbitol solution containing 70% by weight of sorbitol, and 5.320 g of aqueous KOH solution containing 44.87% by weight of KOH. The contents of the autoclave were then dewatered at 115° C.

while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 207.2 g of propylene oxide (3.567 mol) were metered into the headspace of the autoclave at a stirrer speed of 800 rpm over a period of 1.8 h; the metered addition was commenced at an absolute pressure of 0.05 bar. The end of metered addition of propylene oxide was followed by a post-reaction period of duration 0.47 h. The reactor pressure was then adjusted by means of nitrogen to 2.55 bar and a total of 936.3 g of ethylene oxide were metered into the headspace of the autoclave over a period totalling 10.2 h, commencing at 150° C. Once 360 g of ethylene oxide had been metered in, the reaction temperature in the course of further metered addition of ethylene oxide was lowered to 120° C., which was attained after a further 370 g of the amount of ethylene oxide had been metered in. The remaining ethylene oxide was metered in at 120° C. After a post-reaction period of duration 0.85 h, the product was devolatilized by heating at 120° C. under reduced pressure (10 mbar) over a period of 30 min. After cooling to 80° C., 120 ml of distilled water and 17.172 g of a 12.15% by weight aqueous sulphuric acid solution were added, and the mixture was stirred at 80° C. over a period of 30 min. The mixture formed was discharged into a glass flask, and 0.5436 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 98.1 mg KOH/g was obtained. The material became turbid after a few days of storage at room temperature. At 40° C., a viscosity of 347 mPas was found.

Example 10, Comparative

A 2 liter laboratory autoclave under a nitrogen atmosphere was charged with 93.5 g of an aqueous sorbitol solution containing 70% by weight of sorbitol, and 5.324 g of aqueous KOH solution containing 44.87% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 208.9 g of propylene oxide (3.597 mol) were metered into the headspace of the autoclave at a stirrer speed of 800 rpm over a period of 1.52 h; the metered addition was commenced at an absolute pressure of 0.05 bar. The end of metered addition of propylene oxide was followed by a post-reaction period of duration 0.81 h. The reactor pressure was then adjusted by means of nitrogen to 2.55 bar and a total of 935.9 g of ethylene oxide were metered in over a period totalling 11.7 h at 150° C. After a post-reaction period of duration 0.30 h, the product was devolatilized by heating at 150° C. under reduced pressure (10 mbar) over a period of 30 min. After cooling to 80° C., 120 ml of distilled water and 17.184 g of a 12.15% by weight aqueous sulphuric acid solution were added, and the mixture was stirred at 80° C. over a period of 30 min. The mixture formed was discharged into a glass flask, and 0.548 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 99.6 mg KOH/g was obtained. The material solidified in the course of cooling to room temperature. At 40° C., a viscosity of 335 mPas was found.

Example 11, Comparative

A 2 liter laboratory autoclave under a nitrogen atmosphere was charged with 93.1 g of an aqueous sorbitol solution containing 70% by weight of sorbitol, and 5.195 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 1135.1 g of propylene oxide (19.544 mol) were metered into the headspace of the autoclave at a stirrer speed of 800 rpm over a period of 5.0 h; the metered addition was commenced at an absolute pressure of 0.05 bar. After a post-reaction period of duration 3.6 h, the product was devolatilized by heating at 150° C. under reduced pressure (10 mbar) over a period of 30 min. After cooling to 80° C., 100 ml of distilled water and 17.50 g of a 12.15% by weight aqueous sulphuric acid solution were added, and the mixture was stirred at 80° C. over a period of 30 min. The mixture formed was discharged into a glass flask, and 0.5441 g of IRGANOX® 1076 was added. Thereafter, the product was dewatered at 18 mbar (water-jet vacuum) for 1 h and then at 8 mbar and 110° C. over a period of 3 h. After filtration through a depth filter (T 750, from Seitz), a clear product with an OH number of 101 mg KOH/g and a viscosity of 652 mPas (at 25° C.) was obtained.

Example 12, Comparative

A 2 liter laboratory autoclave under a nitrogen atmosphere was charged with 93.1 g of an aqueous sorbitol solution containing 70% by weight of sorbitol, and 5.085 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 1135.1 g of propylene oxide (19.544 mol) were metered into the headspace of the autoclave at a stirrer speed of 800 rpm over a period of 6.8 h; the metered addition was commenced at an absolute pressure of 0.05 bar. After a post-reaction period of duration 2.0 h, the product was devolatilized by heating at 150° C. under reduced pressure (10 mbar) over a period of 30 min. After cooling to 80° C., 100 ml of distilled water and 17.049 g of a 12.15% by weight aqueous sulphuric acid solution were added, and the mixture was stirred at 80° C. over a period of 30 min. The mixture formed was discharged into a glass flask, and 0.5381 g of IRGANOX® 1076 was added. Thereafter, the product was dewatered at 18 mbar (water-jet vacuum) for 1 h and then at 8 mbar and 110° C. over a period of 3 h. After filtration through a depth filter (T 750, from Seitz), a clear product with an OH number of 101 mg KOH/g and a viscosity of 265 mPas (at 40° C.) was obtained.

Example 13, Comparative

A 2 liter laboratory autoclave under a nitrogen atmosphere was charged with 65.7 g of glycerol and 5.134 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 206.1 g of propylene oxide (3.549 mol) were metered into the headspace of the autoclave at a stirrer speed of 800 rpm over a period of 2.08 h; the metered addition was commenced at an absolute pressure of 0.05 bar. The end of metered addition of propylene oxide was followed by a post-reaction period of duration 0.50 h. The reactor pressure was then adjusted by means of nitrogen to 2.55 bar and a total of 928.3 g of ethylene oxide were metered in over a period totalling 9.6 h at 150° C. After a post-reaction period of duration 1.20 h, the product was devolatilized by heating at 150° C. under reduced pressure (10 mbar) over a period of 30 min. After cooling to 80° C., 120 ml of distilled water and 18.148 g of a 12.15% by weight aqueous sulphuric acid solution were added, and the mixture was stirred at 80° C. over a period of 30 min. The mixture formed was discharged into a glass flask, and 0.5467 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), a clear product with an OH number of 100.3 mg KOH/g and a viscosity of 383 mPas (at 25° C.) was obtained.

Example 14, Comparative

A 2 liter laboratory autoclave under a nitrogen atmosphere was charged with 79.9 g of an aqueous sorbitol solution containing 70% by weight of sorbitol, and 5.174 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 2.67 h. In the course of this, towards the end of the dewatering period, a pressure of 100-120 mbar was established. The mixture was heated to 150° C. and 352.9 g of propylene oxide (6.076 mol) were metered into the headspace of the autoclave at a stirrer speed of 800 rpm over a period of 5.68 h; the metered addition was commenced at an absolute pressure of 0.05 bar. The end of metered addition of propylene oxide was followed by a post-reaction period of duration 1.08 h. The reactor pressure was then adjusted by means of nitrogen to 2.55 bar and a total of 791.8 g of ethylene oxide were metered in over a period totalling 8.70 h at 150° C. After a post-reaction period of duration 1.20 h, the product was devolatilized by heating at 150° C. under reduced pressure (10 mbar) over a period of 30 min. After cooling to 80° C., 120 ml of distilled water and 17.971 g of a 11.74% by weight aqueous sulphuric acid solution were added, and the mixture was stirred at 80° C. over a period of 30 min. The mixture formed was discharged into a glass flask, and 0.5390 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 89.6 mg KOH/g and a viscosity of 699 mPas (at 25° C.) was obtained. The material rapidly became turbid in the course of cooling to room temperature.

Example 15, Comparative

A 2 liter laboratory autoclave under a nitrogen atmosphere was charged with 69.2 g of an aqueous sorbitol solution containing 70% by weight of sorbitol, and 5.502 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.05 h. In the course of this, towards the end of the dewatering period, a pressure of 100-120 mbar was established. The mixture was heated to 150° C. and 461.5 g of propylene oxide (7.946 mol) were metered into the headspace of the autoclave at a stirrer speed of 800 rpm over a period of 6.38 h; the metered addition was commenced at an absolute pressure of 0.05 bar. The end of metered addition of propylene oxide was followed by a post-reaction period of duration 1.65 h. The reactor pressure was then adjusted by means of nitrogen to 2.55 bar and a total of 690.4 g of ethylene oxide were metered in over a period totalling 8.55 h at 150° C. After a post-reaction period of duration 2.88 h, the product was devolatilized by heating at 150° C. under reduced pressure (10 mbar) over a period of 30 min. After cooling to 80° C., 120 ml of distilled water and 20.003 g of a 11.74% by weight aqueous sulphuric acid solution were added, and the mixture was stirred at 80° C. over a period of 30 min. The mixture formed was discharged into a glass flask, and 0.5580 g of IRGANOX® 1076 was added. Thereafter, the product was dewatered at 18 mbar (water-jet vacuum) for 1 h and then at 1 mbar and 110° C. over a period of 3 h. After filtration through a depth filter (T 750, from Seitz), an initially clear product with an OH number of 74.4 mg KOH/g and a viscosity of 783 mPas (at 25° C.) was obtained. The material rapidly became turbid in the course of cooling to room temperature.

Example 16, Comparative

A 2 liter laboratory autoclave under a nitrogen atmosphere was charged with 97.6 g of an aqueous sorbitol solution containing 70% by weight of sorbitol, and 5.082 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.0 h. In the course of this, towards the end of the dewatering period, a pressure of 100-120 mbar was established. The mixture was heated to 150° C. and 156.6 g of propylene oxide (2.696 mol) were metered into the headspace of the autoclave at a stirrer speed of 800 rpm over a period of 1.20 h; the metered addition was commenced at an absolute pressure of 0.05 bar. The end of metered addition of propylene oxide was followed by a post-reaction period of duration 2.20 h. The reactor pressure was then adjusted by means of nitrogen to 2.55 bar and a total of 975.4 g of ethylene oxide were metered in over a period totalling 8.57 h at 150° C. After a post-reaction period of duration 0.80 h, the product was devolatilized by heating at 150° C. under reduced pressure (10 mbar) over a period of 30 min. After cooling to 80° C., 120 ml of distilled water and 19.8122 g of a 11.74% by weight aqueous sulphuric acid solution were added, and the mixture was stirred at 80° C. over a period of 30 min. The mixture formed was discharged into a glass flask, and 0.5439 g of IRGANOX® 1076 was added. Thereafter, the product was dewatered at 18 mbar (water-jet vacuum) at 80° C. to 110° C. for 1 h and then at 110° C. and 1 mbar over a period of 3 h. After filtration through a depth filter (T 750, from Seitz), an initially clear product with an OH number of 104.3 mg KOH/g and a viscosity of 335 mPas (at 40° C.) was obtained. The material solidified in the course of cooling to room temperature.

Example 17, Comparative

A 2 liter laboratory autoclave under a nitrogen atmosphere was charged with 93.4 g of an aqueous sorbitol solution containing 70% by weight of sorbitol, and 12.285 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3.17 h. In the course of this, towards the end of the dewatering period, a pressure of 100-120 mbar was established. The mixture was heated to 150° C. and 908.2 g of propylene oxide (15.637 mol) were metered into the headspace of the autoclave at a stirrer speed of 800 rpm over a period of 6.75 h; the metered addition was commenced at an absolute pressure of 0.05 bar. The end of metered addition of propylene oxide was followed by a post-reaction period of duration 0.92 h. The reactor pressure was then adjusted by means of nitrogen to 2.55 bar and a total of 227.0 g of ethylene oxide were metered in over a period totalling 2.27 h at 150° C. After a post-reaction period of duration 2.73 h, the product was devolatilized by heating at 150° C. under reduced pressure (10 mbar) over a period of 30 min. After cooling to 80° C., 120 ml of distilled water and 42.621 g of a 11.74% by weight aqueous sulphuric acid solution were added, and the mixture was stirred at 80° C. over a period of 30 min. The mixture formed was discharged into a glass flask, and 0.6066 g of IRGANOX® 1076 was added. Thereafter, the product was dewatered at 18 mbar (water-jet vacuum) at 80° C. for 1 h and then at 110° C. and 8 mbar over a period of 3 h. After filtration through a depth filter (T 750, from Seitz), an initially clear product with an OH number of 101 mg KOH/g was obtained. The material rapidly became turbid in the course of cooling to room temperature.

The test results are presented in Table 1

The invention claimed is:

1. Process for preparing polyether polyols based on starter compounds having Zerevitinov-active hydrogen atoms, having n En blocks each comprising at least 75% by weight of oxyethylene units, and m Pm blocks each comprising at least 60% by weight of oxypropylene units, where n and m are each natural numbers from 1 to 10 and at least one starter compound having at least one Zerevitinov-active hydrogen atom and a melting point of ≥40° C., comprising reacting the at least one starter compound with ethylene oxide and propylene oxide in the presence of a catalyst, wherein the Pm block(s) are metered in under the conditions of the following in equation $$\frac{x_m(PO)}{x(OH) * t_m(PO) * OHZ} < 0.0060 \, in[g/(h*\{mg \, KOH\})] \quad (1)$$

where
  $x_m(PO)$ is defined as the molar amount of propylene oxide metered in for the Pm block in mol,
  $x(OH)$ is defined as the molar amount of hydroxyl groups in the polyether polyol in mol,
  $t_m(PO)$ is defined as the metering time for the propylene oxide of the Pm block in hours,
  OHZ is defined as the calculated OH number of the polyether polyol in mg KOH/g, and
  m is as defined above,
and wherein the total content of oxyethylene units in the polyether polyol, based on the total mass of the alkylene oxides metered in, is from 5 to 90% by weight.

TABLE 1

| Example | $x_m$(PO) [mol] | x(OH) [mol] | $t_m$(PO) [h] | calc. OHZ [mg KOH/g] | $\frac{x(PO)}{x(OH)*t_m(PO)*OHZ}$ in [g/(h*{mg KOH})] | Appearance | Comments |
|---|---|---|---|---|---|---|---|
| 1 | 3.58 | 2.15 | 5.88 | 100 | 0.0028 | clear | |
| 2 | 3.59 | 2.16 | 4.05 | 100 | 0.0041 | clear | |
| 3 | 5.81 | 3.49 | 1.75 | 160 | 0.0058 | clear | |
| 4 | 3.38 | 4.07 | 1.10 | 190 | 0.0040 | clear | |
| 5 | 3.47 | 3.08 | 1.47 | 144 | 0.0053 | clear | |
| 6 (comparative) | 3.57 | 2.15 | 1.62 | 100 | 0.0102 | solid | |
| 7 (comparative) | 3.58 | 2.15 | 1.75 | 100 | 0.0095 | turbid | |
| 8 (comparative) | 14.96 | 3.74 | 3.32 | 213 | 0.0057 | clear | no ethylene oxide used |
| 9 (comparative) | 3.57 | 2.16 | 1.80 | 100 | 0.0092 | turbid | |
| 10 (comparative) | 3.60 | 2.15 | 1.52 | 99.9 | 0.0110 | solid | |
| 11 (comparative) | 19.54 | 2.15 | 5.00 | 100 | 0.0182 | clear | no ethylene oxide used |
| 12 (comparative) | 19.54 | 2.15 | 6.80 | 100 | 0.0134 | clear | no ethylene oxide used |
| 13 (comparative) | 3.55 | 2.14 | 2.08 | 100 | 0.0080 | clear | starter liquid at room temperature used |
| 14 (comparative) | 6.08 | 1.84 | 5.68 | 86.0 | 0.0068 | turbid | |
| 15 (comparative) | 7.94 | 1.59 | 6.38 | 74.5 | 0.0105 | turbid | |
| 16 (comparative) | 2.70 | 2.25 | 1.20 | 105 | 0.0095 | solid | |
| 17 (comparative) | 15.64 | 2.15 | 6.75 | 101 | 0.0107 | turbid | |

2. Process according to claim 1, wherein the Pm block comprises or the Pm blocks comprise at least 75% by weight of oxypropylene units, based on the total mass of the alkylene oxides metered in for this block or these blocks.

3. Process according to claim 1, wherein the polyether polyols contain up to 85% by weight of oxyethylene units, based on the total mass of the alkylene oxides metered in.

4. Process according to claim 1, wherein at least one En block contains at least 90% by weight of oxyethylene units.

5. Process according to claim 1, wherein one En block is an end block.

6. Process according to claim 1, wherein the calculated OH number of the polyether polyols is from 50 mg KOH/g to 400 mg KOH/g.

7. Process according to claim 1, wherein the polyether polyols consist of the En and Pm blocks and the structural units originating from the starter compound.

8. Process according to claim 1, wherein at least one further starter compound having a melting point <40° C. is used in a proportion of up to 30% by weight based on the total mass of all starter compounds.

9. Process according of claim 1, wherein no solvent is used in the reaction of the starter compound with ethylene oxide and propylene oxide and any further alkylene oxide compounds.

10. Process according to claim 1, wherein the catalyst is a base.

11. Process according to claim 1, wherein the catalyst is used in a concentration, based on the amount of end product, of 0.004 to 1.0% by weight.

12. Process according to claim 1, wherein the catalyst used is potassium hydroxide.

13. Process according to claim 1, wherein the at least one starter compound is reacted with ethylene oxide and propylene oxide at a temperature of 70 to 170° C.

14. Process according to claim 1, wherein the starter compound used is selected from the group consisting of pentaerythritol, sucrose, trimethylolpropane, sorbitol and mixtures thereof.

15. Polyether polyols prepared by a process according to claim 1.

16. Polyether polyols according to claim 15, wherein the polyether polyols at 20° C. are visually clear.

17. Polyether polyols according to claim 15, wherein the polyether polyols at 20° C. are homogeneous.

18. Polyether polyols according to claim 15, wherein the polyether polyols at 20° C. are visually clear and homogeneous.

* * * * *